United States Patent
Gantman et al.

(10) Patent No.: US 9,100,383 B2
(45) Date of Patent: Aug. 4, 2015

(54) SIMULTANEOUS REMOTE AND LOCAL CONTROL OF COMPUTER DESKTOP

(75) Inventors: Alex Gantman, Yokneam (IL); Anatoly Gutnick, Herzlia (IL)

(73) Assignee: BBY Solutions, Inc., Richfield, MN (US)

( * ) Notice: Subject to any disclaimer, the term of this patent is extended or adjusted under 35 U.S.C. 154(b) by 1027 days.

(21) Appl. No.: 12/215,008

(22) Filed: Jun. 24, 2008

(65) Prior Publication Data

US 2009/0300510 A1 Dec. 3, 2009

Related U.S. Application Data

(63) Continuation of application No. 12/154,721, filed on May 27, 2008, now abandoned.

(51) Int. Cl.

| | |
|---|---|
| *G06F 3/00* | (2006.01) |
| *G06F 15/16* | (2006.01) |
| *H04L 29/08* | (2006.01) |
| *G06F 9/44* | (2006.01) |
| *G06F 3/0481* | (2013.01) |
| *H04M 3/56* | (2006.01) |

(52) U.S. Cl.
CPC .............. *H04L 67/08* (2013.01); *G06F 3/0481* (2013.01); *G06F 9/4443* (2013.01); *G06F 9/4445* (2013.01); *G06F 9/4446* (2013.01); *H04L 67/025* (2013.01); *H04M 3/567* (2013.01)

(58) Field of Classification Search
CPC .............................. G06F 9/4445; G06F 9/4446
See application file for complete search history.

(56) References Cited

U.S. PATENT DOCUMENTS

| | | | | |
|---|---|---|---|---|
| 5,758,110 | A  * | 5/1998  | Boss et al. | 715/751 |
| 6,691,154 | B1 * | 2/2004  | Zhu et al. | 709/204 |
| 7,475,419 | B1 * | 1/2009  | Basu et al. | 726/2 |
| 7,614,060 | B2 * | 11/2009 | Rao et al. | 719/320 |
| 2005/0091571 | A1 * | 4/2005 | Leichtling | 715/500 |
| 2005/0193143 | A1 * | 9/2005 | Meyers et al. | 709/238 |
| 2006/0230156 | A1 * | 10/2006 | Shappir et al. | 709/227 |
| 2007/0288599 | A1 * | 12/2007 | Saul et al. | 709/218 |

(Continued)

OTHER PUBLICATIONS

"U.S. Appl. No. 12/154,721, Non-Final Office Action mailed Jan. 21, 2010", 8 pgs.
"U.S. Appl. No. 12/154,721, Preliminary Amendment A filed Aug. 12, 2008", 38 pgs.

(Continued)

*Primary Examiner* — Azizul Choudhury
(74) *Attorney, Agent, or Firm* — Schwegman Lundberg & Woessner, P.A.

(57) ABSTRACT

A method for computing includes running a desktop sharing program on a local computer so as to permit a remote user to view, on a remote computer, which is connected to communicate with the local computer via a network, an image of an entire area of a display screen of the local computer and to operate the local computer by remote input via the remote computer. A local window is defined within the display screen of the local computer for running an application under control of a local user. Local inputs made via a local input device of the local computer by the local user are intercepted so that the local inputs do not interfere with operation of the local computer by the remote user. The intercepted inputs are directed to the local window so as to permit the local user to interact with the application independently of the operation of the local computer by the remote user.

23 Claims, 5 Drawing Sheets

(56) References Cited

U.S. PATENT DOCUMENTS

2008/0183811 A1* 7/2008 Kotras et al. ............... 709/203
2008/0201457 A1* 8/2008 London ...................... 709/222
2009/0049174 A1* 2/2009 Rudnik ....................... 709/226
2009/0300131 A1   12/2009 Gantman et al.

OTHER PUBLICATIONS

"U.S. Appl. No. 12/154,721, Preliminary Amendment B filed Aug. 12, 2008", 39 pgs.
"U.S. Appl. No. 12/154,721, Preliminary Amendment C filed Oct. 6, 2008", 43 pgs.

* cited by examiner

FIG. 2A

CERTIFIED EXPERTS

JOE
FANTASTIC GREAT, JUST WHAT I NEEDED 20 YEARS
EXPERIENCE IS YOURS NOW.
XP,VISTA, MICROSOFT OFFICE EMAIL ACCOUNT SETUP...
☆☆☆☆☆
1057 CASES
$75.00/SESSION

MICHAEL ROBERTSON
THERE IS NO SUCH THING A STUPID QUESTION INTIAL
CONSULTATION IS ABSOLUTELY FREE
I HAVE OVER 5 YEARS OF EXPERIENCE IN ALL....
☆☆☆☆☆
51 CASES
$20.00/SESSION

JIMMY PC DOCTOR
FREE ESTIMATE! I CAN SOLVE ANY WINDOWS
RELATED PROMBLEMS.....
☆☆☆☆☆
56 CASES
$0.99/MINUTE

MICHAEL
OVER 11 YEARS EXPERIENCE IN TECHNOLOGY. SLOW COMPUTERS,
POP-UPS, COMPUTER CRASH AND WANT TO RECOVER YOUR FILES...
☆☆☆☆☆
52 CASES
$24.95/SESSION

DAN
HOME USER DESKTOP SUPPRRT.
WILL NOT RUSH YOU AND WILL TAKE MY TIME....
☆☆☆☆☆
520 CASES
$1/MINUTE

SIMULTANEOUS REMOTE AND LOCAL CONTROL OF COMPUTER DESKTOP

FIELD OF THE INVENTION

The present invention relates generally to computer systems and software, and specifically to remote desktop applications.

BACKGROUND OF THE INVENTION

In typical operation, a personal computer supports a single keyboard and a single pointing device. A number of software tools have been developed, however, to allow more than one pointing device to be used in computer applications, particularly for multi-player games. Examples include CPNMouse, which is available at SourceForge.net, and ManyMouse, available at icculus.org.

Remote desktop programs enable the user of one computer to view the desktop of another computer and control the functions of that computer remotely (via the Internet or other network). Some remote desktop tools permit a computer to be controlled simultaneously by a remote user and a local user. Such tools may, for example, permit both the local and remote users to move a cursor on the local user's computer screen by manipulating their respective pointing devices, or to enter text via their respective keyboards.

Whereas many tools give the remote user full control over all computer operations, methods have been proposed for limiting the scope of remote control. For example, U.S. Pat. No. 5,758,110, whose disclosure is incorporated herein by reference, describes a method for task-based application sharing, in which a host user designates an application to be shared with another user at a remote location, referred to as the client user. The shared application runs and executes only on the host system. The client system renders an image of all windows of the shared application without also displaying unshared applications. Both the client and the host users continue to perform normal operations outside of the shared area, and the host user defines the tasks which are to be shared.

SUMMARY OF THE INVENTION

In embodiments of the present invention, a desktop sharing program running on a local computer enables a remote user to view an image of the entire area of the display screen of the local computer and to operate the local computer by remote input. To permit the local user to interact with the local computer while the remote user is working, a local window is defined within the display screen of the local computer. The local window can be used to run an application under control of the local user independently of the operations performed by the remote user. For this purpose, the local computer intercepts local inputs made by the local user and directs the intercepted inputs to the local window, thus enabling the local user to interact with the application without interfering with the work of the remote user.

There is therefore provided, in accordance with an embodiment of the present invention, a method for computing, including:

running a desktop sharing program on a local computer so as to permit a remote user to view, on a remote computer, which is connected to communicate with the local computer via a network, an image of an entire area of a display screen of the local computer and to operate the local computer by remote input via the remote computer;

defining a local window within the display screen of the local computer for running an application under control of a local user;

intercepting local inputs made via a local input device of the local computer by the local user so that the local inputs do not interfere with operation of the local computer by the remote user; and directing the intercepted inputs to the local window so as to permit the local user to interact with the application independently of the operation of the local computer by the remote user.

In disclosed embodiments, the local window is not reproduced in the image of the entire area of the display screen that is presented on the remote computer. Typically, the local window is defined as an overlay window on the local computer. Additionally or alternatively, defining the local window includes displaying the local window as a semi-transparent overlay on the display screen that is presented on the local computer.

In some embodiments, running the remote desktop program includes moving a first cursor on the display screen in response to manipulation of a remote pointing device of the remote computer by the remote user, and directing the intercepted inputs includes moving a second cursor on the display screen, independently of the first cursor, under the control of the local user by means of a local pointing device of the local computer. The second cursor may be effective to select objects on the display screen only within the local window.

Additionally or alternatively, intercepting the local inputs includes intercepting keystrokes made by the local user by means of a local keyboard of the local computer, and directing the intercepted inputs includes displaying input text, responsively to the intercepted keystrokes, in the local window. In one embodiment, running the application includes running a textual chat application, in which the input text is transmitted over the network to the remote user, and textual responses from the remote user are displayed in the local window. The desktop sharing program may be used by the remote user in providing service support to the local user.

There is also provided in accordance with an embodiment of the present invention, a computer software product, including a tangible computer-readable medium in which program instructions are stored, which instructions, when read by a local computer, cause the local computer to run a desktop sharing program so as to permit a remote user to view, on a remote computer, which is connected to communicate with the local computer via a network, an image of an entire area of a display screen of the local computer and to operate the local computer by remote input via the remote computer, wherein the instructions cause the local computer to define a local window within the display screen of the local computer for running an application under control of a local user, to intercept local inputs made via a local input device of the local computer by the local user so that the local inputs do not interfere with operation of the local computer by the remote user, and to direct the intercepted inputs to the local window so as to permit the local user to interact with the application independently of the operation of the local computer by the remote user.

There is additionally provided, in accordance with an embodiment of the present invention, a local computer, including:

a local input device;

a display monitor; and a processor, which is configured to run a desktop sharing program so as to permit a remote user to view, on a remote computer, which is connected to communicate with the local computer via a network, an image of an entire area of a display screen of the local computer and to operate the local computer by remote input via the remote computer, and to define a local window within the display screen that is displayed on the display monitor of the local computer for running an application under control of a local user, to intercept local inputs made via the local input device by the local user so that the local inputs do not interfere with operation of the local computer by the remote user, and to direct the intercepted inputs to the local window so as to permit the local user to interact with the application independently of the operation of the local computer by the remote user.

The present invention will be more fully understood from the following detailed description of the embodiments thereof, taken together with the drawings in which:

BRIEF DESCRIPTION OF THE DRAWINGS

FIGS. 2A, 2B and 2C are schematic representations of display screens of a local computer and a remote computer, in accordance with an embodiment of the present invention;

DETAILED DESCRIPTION OF EMBODIMENTS

Overview

Figure 1:
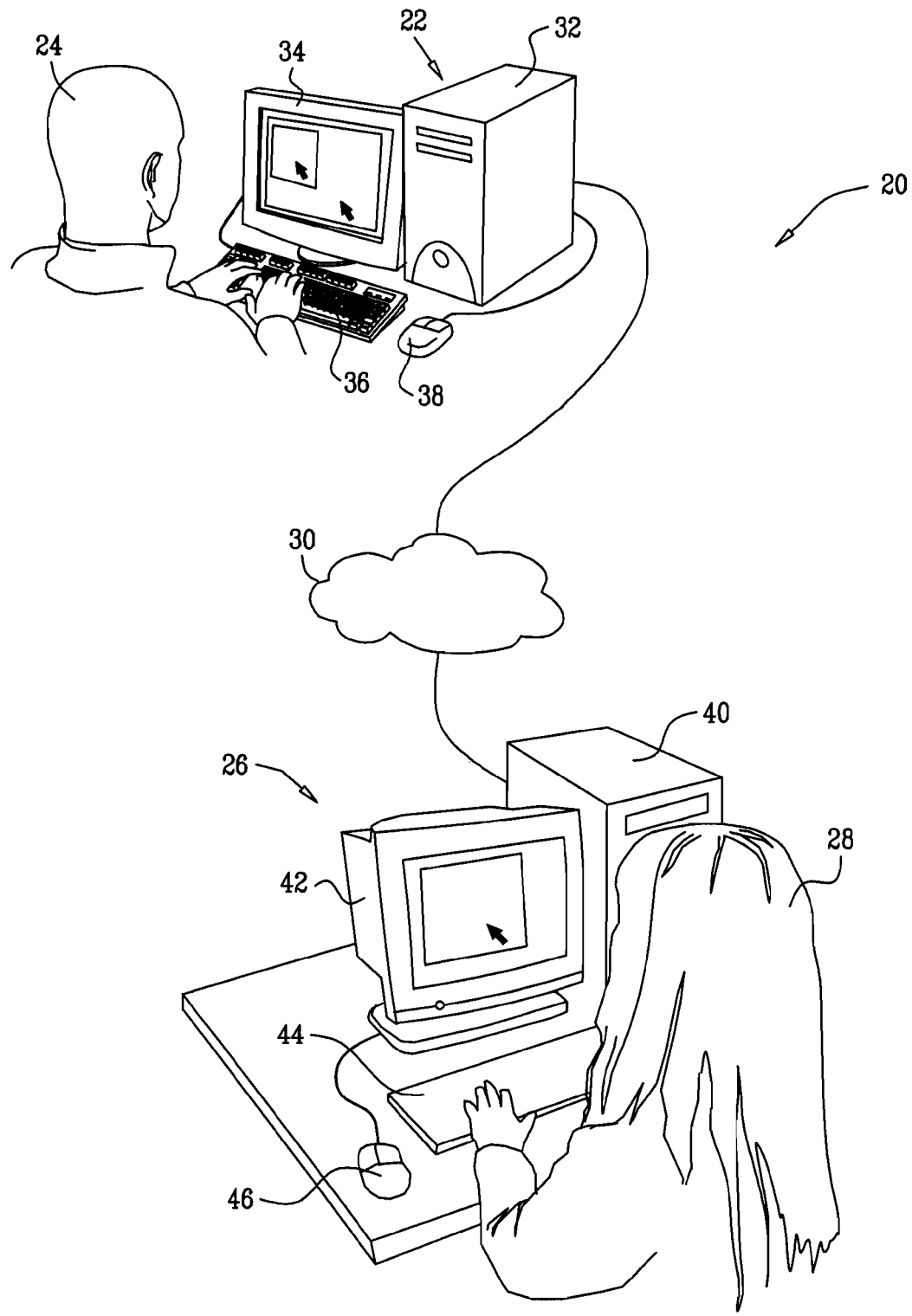
FIG. 1 is a schematic, pictorial illustration of a system providing remote control of a local computer, in accordance with an embodiment of the present invention.

Although remote desktop programs commonly allow both the remote user and the local user to interact with the computer via their respective input devices, this situation may lead to conflicts. For example, the local and remote users may simultaneously try to move the on-screen cursor using their respective pointing devices (sometimes referred to as "fighting over the mouse"), or to enter text input in an application window using their keyboards.

One sort of situation in which conflicts of this sort may arise is in remote support applications, in which the remote user services the local user's computer and/or instructs the local user in proper operation of the computer. In such situations, it is often desirable for the local and remote users to conduct an on-screen textual chat while the remote user is working on the local user's computer. If both the remote user and the local user attempt to enter text in the chat window at the same time, however, the result may be at best annoying and possibly unintelligible to both users. (This is one reason why in current practice, it is common for the remote user to keep a telephone connection open with the local user during such support sessions.) Problems may similarly arise if both the remote user and the local user attempt to move the on-screen cursor using their respective pointing devices.

The embodiments of the present invention that are described hereinbelow permit the remote user to exercise full control over the functions of the local computer, and to view the entire area of the local computer display screen, while still leaving a local window under the control of the local user. Typically, the local window appears only on the local computer screen and is not reproduced in the image of the screen that is rendered on the remote computer. A desktop sharing engine on the local computer intercepts local inputs made by the local user via local input devices, such as the keyboard and mouse, and directs these inputs to the local window, while permitting the remote user to control all other operations of the local computer by input from the remote computer.

The local window is particularly useful in supporting textual chat between the local and remote users, in the sort of support applications that are described above, for example, but it can alternatively be used to run substantially any sort of application on the local computer (for example, a game of Solitaire to pass the time until the remote user has finished working). When the local window is active, two cursors may appear on the local computer screen: the system cursor, controlled by the remote user's pointing device, and a local cursor, controlled by the local input that is intercepted by the desktop sharing engine. Both cursors may be used by their respective users simultaneously and independently to select objects on the screen, including performing operations such as drag/drop and cut/paste.

Various implementations of the principles of the present invention are possible, depending on user requirements and system constraints. In the embodiments described hereinbelow, a single local window is used for textual chat in a remote support application, and the local cursor may be limited to operating in this window. In other embodiments, multiple local windows may be deployed, with configurable properties, and the local cursor may have extended capabilities. For example, the local windows may be accessible only to the local user or may be shared with the remote user, and the local user may be prompted to indicate, upon opening a local window, whether or not this window should be accessible to the remote user. The local user may be required to select applications to open in a local window from a "private" application list, in order to avoid fighting over the mouse when attempting to open and control the application.

System Description

FIG. 1 is a schematic, pictorial illustration of a system 20 for providing remote control of a local computer 22, in accordance with an embodiment of the present invention. The local computer, which is operated by a local user 24, communicates via a network 30, such as the Internet or a local area network (LAN), with a remote computer 26, operated by a remote user 28. The terms "local" and "remote" are used herein arbitrarily, for the sake of convenience and clarity in identifying the computers that are involved in system 20 and their respective users and peripheral devices. "Local" refers to the computer whose operations are controlled by another computer, while "remote" refers to the controlling computer. There is not necessarily any substantive difference between the computers themselves, however, and the roles of the local and remote computers could just as well be reversed by appropriate software configuration.

Local computer 22 and remote computer 26 are assumed to comprise personal computers, with appropriate peripheral devices and software for carrying out the functions described herein. Alternatively, one or both of the computers may comprise a server or any other suitable type of fixed or portable computing device with an appropriate communication link and software. In the present embodiment, local computer 22 comprises a processor 32, with a display monitor 34 and input devices, such as a keyboard 36 and a mouse 38. Remote computer 26 comprises similar components: a processor 40, display monitor 42, keyboard 44 and mouse 46. Alternatively or additionally, one or both of the computers may comprise other sorts of peripheral devices, such as a joystick, trackball, or other type of pointing device (in addition to or instead of the mouse) Although certain features of system 20 are described hereinbelow with specific reference to mouse 38 and mouse 46, these features are equally applicable to other types of pointing devices.

The embodiments that are described below rely on novel desktop sharing software that runs on processors 32 and 40. This software may be downloaded to computers 22 and 26 in electronic form, over a network, for example, or it may additionally or alternatively be provided on tangible storage media, such as optical, magnetic, or electronic memory media. In the description that follows, it is assumed that the desktop sharing software runs in the environment of a standard operating system, such as a Microsoft® Windows® operating system, and some features of the software are described, by way of example, with reference to features and components of Windows. The principles of the present invention, however, may likewise be applied, mutatis mutandis, in other sorts of operating environments, such as UNIX®, Linux®, or Apple® operating environments, as well as in portable computing and communication devices, such as personal digital assistants (PDA's) and smart phones.

Figure 2B:
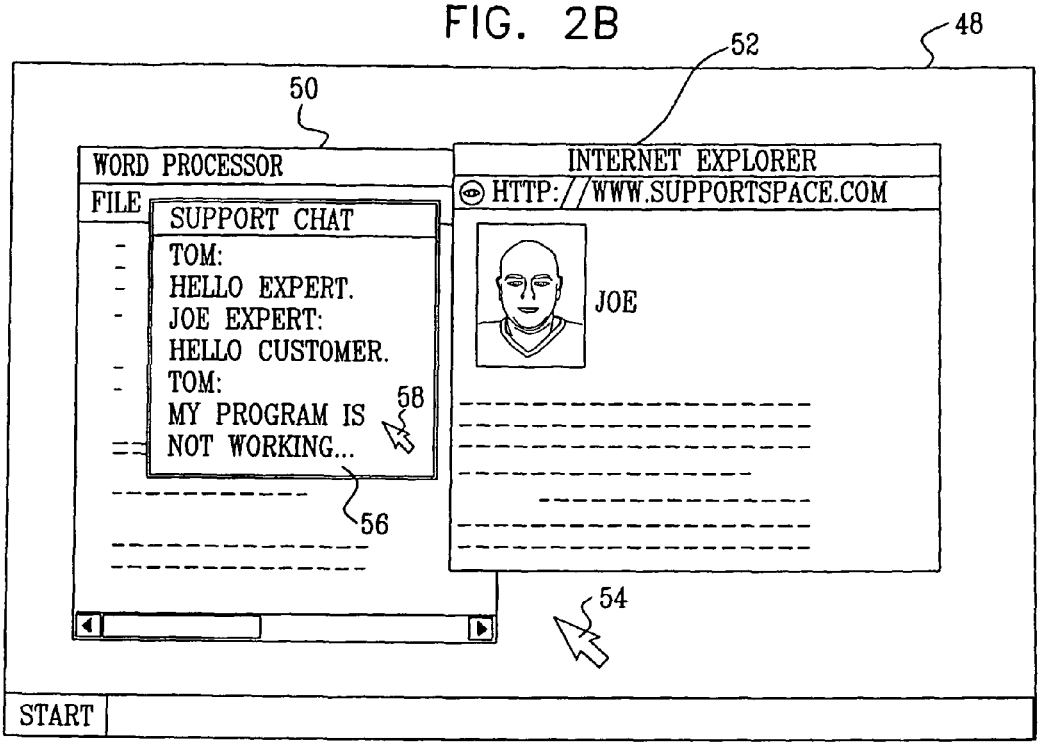
Figure 2C:
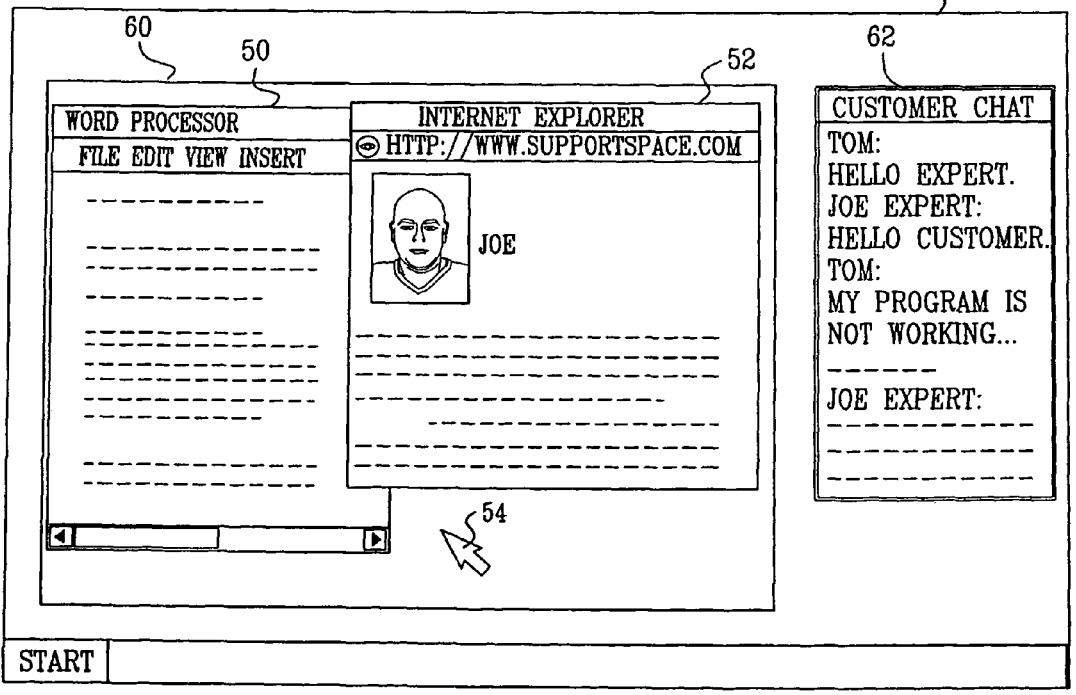

FIGS. 2A, 2B and 2C are schematic representations of display screens 47, 48 and 49, in accordance with an embodiment of the present invention. Screens 47 and 48 are displayed on monitor 34 of local computer 22, while screen 49 is displayed on monitor 42 of remote computer 26 in system 20.

In the example scenario illustrated in FIGS. 2A-2C local user 24, named Tom, uses an Internet browser (window 52) to connect to a support Web site, which offers expert services in fixing computer problems encountered by the local user. (Alternatively, Tom may connect to the support site using other types of applications and communication protocols.) As shown in FIG. 2A, a window 47 is displayed by the browser on the local computer, showing entries 51 offering support services by a number of experts. In this example, the local user selects an expert, named Joe, on the Web site. This expert takes control of local computer 22 (after receiving approval from Tom) as remote user 28 of computer 26, using desktop sharing software that is installed on both of the computers. As a results, screens 48 and 49 (FIGS. 2B and 2C) are displayed on the local and remote computers, respectively.

Screen 48 (commonly referred to as the "desktop" in the Windows paradigm), as seen by local user 24, includes application windows 50 and 52, as well as a system cursor 54, which are defined and controlled by the operating system of computer 22. A local window 56, with a local cursor 58, is overlaid on screen 48, with novel functionality as described hereinbelow. The background of window 56 may be made semi-transparent, by appropriately setting the transparency attribute provided by the Windows operating system, in order to enable local user 24 to view the parts of screen 48 that are below the local window. (For clarity of illustration, however, this feature of window 56 is not shown in FIG. 2A.)

Screen 49, as seen by remote user 28, contains an image 60 of the entire area of screen 48, including windows 50 and 52 and cursor 54. The remote user is able to manipulate cursor 54 using mouse 46, as well as inputting text in windows 50 and 52 via keyboard 44, in the manner that is known generally in the art of remote desktop computing. The remote user can thus interact with and control functions of the operating system and application software running on local computer 22. Local window 56 and cursor 58, however, are typically not reproduced on screen 49, since these elements are reserved for the use of local user 24.

While Joe is working on local computer 22, a textual chat application runs on computer 22 in local window 56. Tom inputs text to the chat in window 56 using keyboard 36, and may also select objects on screen and move them into or within window 56 using cursor 58, under the control of mouse 38. Text that Tom inputs into window 56 appears in a corresponding chat window 62 on screen 49. Joe may type his text responses into this window, whereupon these responses are presented to Tom in window 56, as illustrated in the figures.

As noted earlier, this sort of textual chat is a particularly useful application of local window 56. In the absence of such a dedicated local window, the local and remote users could take turns inputting text to the same window, using their respective keyboards, but this sort of shared control is prone to collision between the respective inputs and often results in confusion and frustration to the users. On the other hand, the local window on computer 22 may be used not only for textual chat, but also for any other sort of application that the local user may wish to run (though applications that could interfere with the work of the remote user are probably best avoided).

Software Structure and Operation

Figure 3:
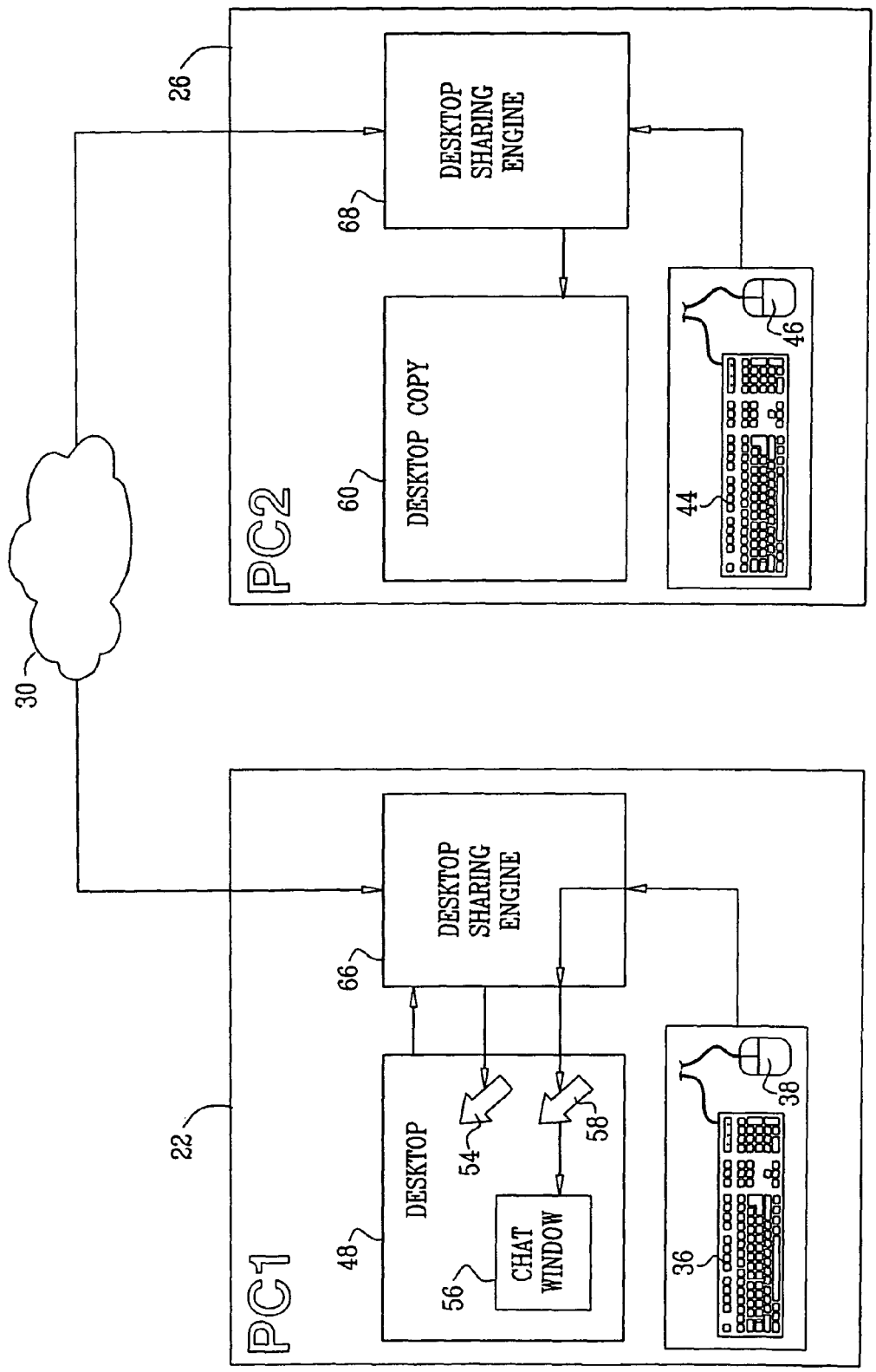
FIG. 3 is a block diagram that schematically shows functional components of local and remote computers, in accordance with an embodiment of the present invention.

FIG. 3 is a block diagram that schematically shows functional components of computers 22 and 26 that are involved in the present method of desktop sharing, in accordance with an embodiment of the present invention. A local desktop sharing engine 66 runs on local computer 22, while a remote desktop sharing engine 68 runs on remote computer 26. The desktop sharing engines may be based, for example, on UltraVNC Remote Control Software (which is available on line at uvnc.com), with certain added features in local engine 66 for supporting local window 56 and cursor 58, as described hereinbelow.

Remote engine 68 receives information from local engine 66 defining the windows on screen 48 and their contents, and uses this information in rendering image 60 on the screen of computer 26. In the Microsoft Windows environment, for example, the information may be provided using the application programming interface (API) of the Windows Graphics Device Interface (GDI) subsystem. Engine 68 also captures inputs made by remote user 28 using keyboard 44 and mouse 46 and transmits these inputs via network 30 to engine 66, as well as displaying the result of the inputs in image 60. In response to the inputs sent from remote engine 68, local engine 66 drives cursor 54 and controls functions of local computer 22 as invoked by the remote user.

Before transmitting screen information to remote engine 68, local engine 66 may filter out the information relating to local window 56. As a result, the remote engine will not reproduce window 56 in image 60, as illustrated in FIG. 2B. Such filtering may be achieved, if local engine 66 uses UltraVNC, simply by defining window 56 as semi-transparent, because UltraVNC as currently configured does not capture GDI information regarding semi-transparent overlay windows. The image screen capture feature of UltraVNC should also be turned off.

Another way to filter out the local window, when the local window is defined as an overlay window, is to use the BitBlt function of the GDI API to capture images of screen 48 both with and without the CAPTUREBLT flag enabled. When CAPTUREBLT is enabled, local engine 66 captures an image of the screen that includes overlay windows (such as window 56). When it is disabled, the overlay windows are omitted from the capture. The local engine combines the images in order to generate an image of screen 48 from which window 56 has been excised, while revealing any windows (such as window 50 in FIG. 2A) underneath window 56.

Figure 4:
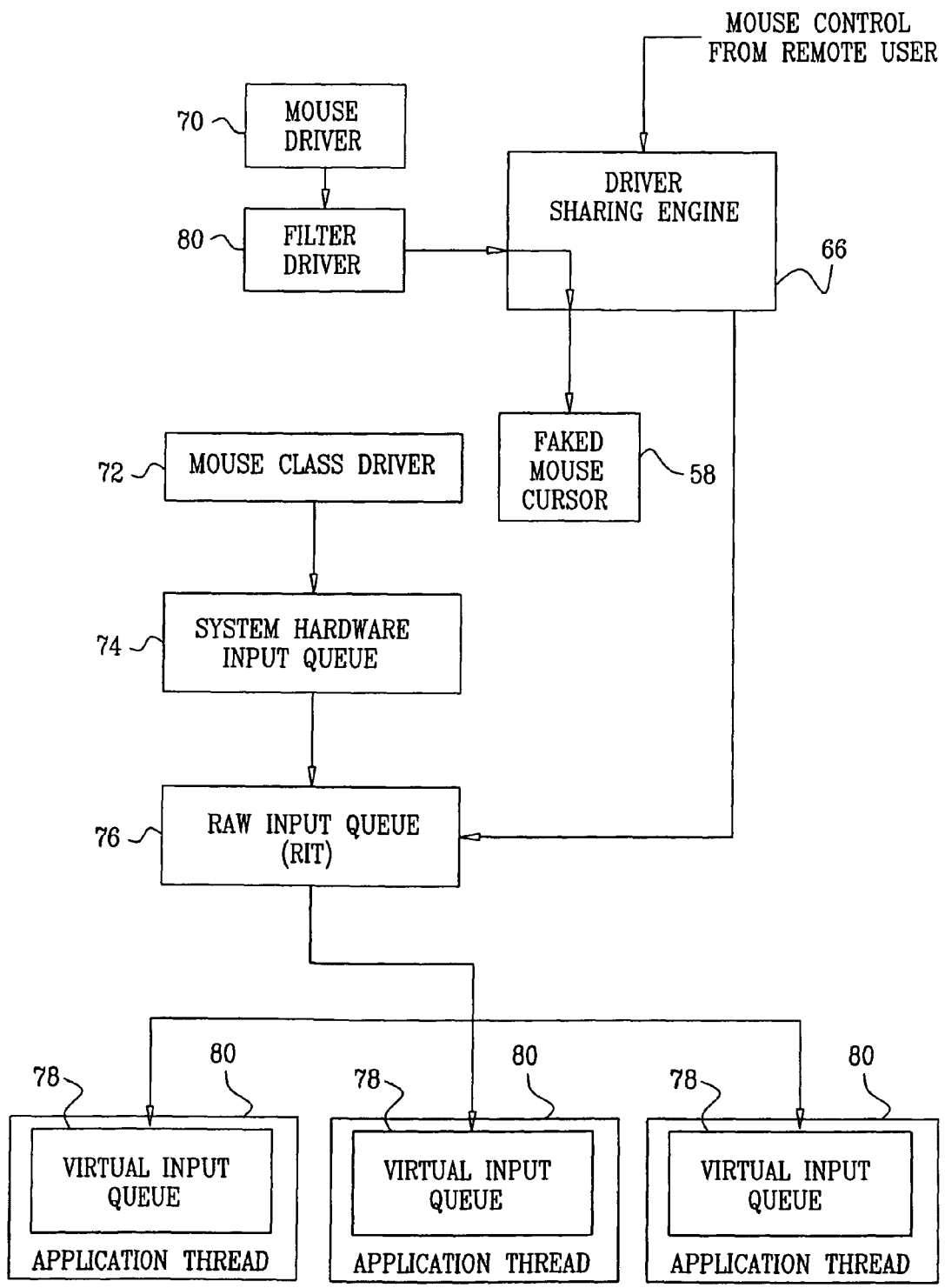
FIG. 4 is a block diagram that schematically illustrates software components running on a local computer, in accordance with an embodiment of the present invention.

FIG. 4 is a block diagram that schematically illustrates software components on local computer 22 that are involved in operating cursors 54 and 58, in accordance with an embodiment of the present invention. In normal Windows operation, a mouse driver 70 captures signals from mouse 38 and generates events (messages) representing movement of the mouse and user clicks on the mouse buttons. A mouse class driver 72 receives and passes these events to a system input queue 74, which then places the events in a raw input thread (RIT) queue 76. From this queue, the events are passed as WM_* mouse messages to respective virtual input queues 78 of application threads 80, which generate the appropriate actions of cursor 54 on screen 48.

When computer 22 is under remote control by computer 26, as described above, local desktop sharing engine 66 receives mouse-related events via network 30 from remote engine 68 and places these events directly in RIT queue 76. The remote events bypass driver 72 and queue 74, and thus permit remote user 28 to manipulate cursor 54. This sort of remote cursor control is implemented, for example, as part of the standard UltraVNC software package described above. Keyboard events on computer 26 are likewise transmitted to and inserted by local engine 66 in the appropriate input queue.

While computer 22 is under remote control, a filter 80 intercepts events from driver 70 that correspond to local inputs by user 24 using mouse 38. These local events are not permitted to pass to mouse class driver 72, since otherwise they would be enqueued and passed to application threads 80, thus "competing" with the remote input for control of cursor 54.

Instead, filter 80 passes the events to local desktop sharing engine 66, which generates "faked" local cursor 58. The cursor is "faked" in the sense that it is not generated by the operating system of computer 22, but is rather rendered on screen 48 by engine 66 in a manner that emulates the operation of "real" cursor 54. Typically, the cursor emulation performed by engine 66 enables local user 22 to use cursor 58 both to point to particular objects (such as words, blocks of text, icons, or other images) and to select and even move objects on screen. Thus, cursor 58 may be used to copy and paste or to drag and drop a block of text or an image, independently of (and without interfering with) similar operations performed by remote user 26 using cursor 54, even when the operations are carried out by both users simultaneously.

Since cursor 58 is generated at the application level, local engine 66 may be configured to limit the range of objects on which the cursor is able to operate. For example, cursor 58 may be tied to the application running in window 56 and may thus be limited to manipulating objects appearing in this window. Alternatively, local engine 66 may be configured to permit cursor 58 to operate on objects outside window 56, although in any case it is desirable to limit the functionality of cursor 58 so as not to interfere with the operations carried out by remote user 28.

A similar sort of filtering arrangement (not shown in the figures) may be used to intercept keystroke input made by local user 24 via keyboard 36 and/or inputs via other local input devices. Local engine 66 processes the keystrokes so as to generate text for display in window 56.

Although the embodiments described hereinabove relate to a particular application context, the principles of the present invention may similarly be applied in substantially any sort of desktop sharing scenario in which multiple users wish to view and operate on the same screen simultaneously. It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for computing, comprising:
   running a desktop sharing program on a local computer so as to permit a remote user to view, on a remote computer, which is connected to communicate with the local computer via a network, an image of an entire area of a display screen of the local computer and to operate the local computer by remote input via the remote computer;
   defining a local window within the display screen of the local computer for running an application under control of a local user;
   modifying the display screen outside the local window in response to the remote user operating the local computer outside the local window by remote input via the remote computer;
   modifying the display screen inside the local window in response to the remote user operating the local computer inside the local window by remote input via the remote computer; and
   intercepting local inputs made via a local input device of the local computer by the local user, so that the local inputs are confined to objects on the display screen of the local computer, within the local window, while the remote user is able to access areas of the display screen of the local computer beyond the local window and the local user is prevented from accessing areas of the display screen of the local computer beyond the local window.

2. The method according to claim 1, wherein the local window is not reproduced in the image of the entire area of the display screen that is presented on the remote computer.

3. The method according to claim 2, wherein the local window is defined as an overlay window on the local computer.

4. The method according to claim 2, wherein defining the local window comprises displaying the local window as a semi-transparent overlay on the display screen that is presented on the local computer.

5. The method according to claim 1, wherein modifying the display screen outside the local window comprises moving a first cursor on the display screen in response to manipulation of a remote pointing device of the remote computer by the remote user, and wherein intercepting the local inputs comprises moving a second cursor on the display screen, independently of the first cursor, under the control of the local user by means of a local pointing device of the local computer.

6. The method according to claim 5, wherein the second cursor is effective to select objects on the display screen only within the local window.

7. The method according to claim 1, wherein intercepting the local inputs comprises intercepting keystrokes made by the local user by means of a local keyboard of the local computer, the method further comprising directing the intercepted inputs by displaying input text, responsively to the intercepted keystrokes, in the local window.

8. The method according to claim 7, the method further comprising running a textual chat application, in which the input text is transmitted over the network to the remote user, and textual responses from the remote user are displayed in the local window.

9. The method according to claim 8, wherein the desktop sharing program is used by the remote user in providing service support to the local user.

10. A computer software product, comprising a tangible non-transitory computer-readable medium in which program instructions are stored, which instructions, when read by a local computer, cause the local computer to run a desktop sharing program so as to permit a remote user to view, on a remote computer, which is connected to communicate with the local computer via a network, an image of an entire area of a display screen of the local computer and to operate the local computer by remote input via the remote computer, wherein the instructions cause the local computer to define a local window within the display screen of the local computer for running an application under control of a local user, to modify the display screen outside the local window in response to the remote user operating the local computer outside the local window by remote input via the remote computer, to modify the display screen inside the local window in response to the remote user operating the local computer inside the local window by remote input via the remote computer, and to intercept local inputs made via a local input device of the local computer by the local user so that the local inputs are confined to controlling a limited range of objects on the display screen of the local computer, including the local window, while the remote user is able to access areas of the display screen of the local computer and the local user is prevented from accessing areas of the display screen of the local computer beyond the local window.

11. The product according to claim 10, wherein the local window is not reproduced in the image of the entire area of the display screen that is presented on the remote computer.

12. The product according to claim 11, wherein the local window is defined as an overlay window on the local computer.

13. The product according to claim 11, wherein the instructions cause the local computer to display the local window as a semi-transparent overlay on the display screen that is presented on the local computer.

14. The product according to claim 10, wherein the instructions cause the local computer to move a first cursor on the display screen in response to manipulation of a remote pointing device of the remote computer by the remote user, and to move a second cursor on the display screen, independently of the first cursor, under the control of the local user by means of a local pointing device of the local computer.

15. The product according to claim 14, wherein the second cursor is effective to select objects on the display screen only within the local window.

16. The product according to claim 10, wherein the instructions cause the local computer to intercept keystrokes made by the local user by means of a local keyboard of the local computer, and to display input text, responsively to the intercepted keystrokes, in the local window.

17. The product according to claim 16, wherein the instructions cause the local computer to run a textual chat application, in which the input text is transmitted over the network to the remote user, and textual responses from the remote user are displayed in the local window.

18. The product according to claim 17, wherein the desktop sharing program is used by the remote user in providing service support to the local user.

19. A local computer, comprising:
a local input device;
a display monitor; and
a processor, which is configured to run a desktop sharing program so as to permit a remote user to view, on a remote computer, which is connected to communicate with the local computer via a network, an image of an entire area of a display screen of the local computer and to operate the local computer by remote input via the remote computer, to define a local window within the display screen that is displayed on the display monitor of the local computer for running an application under control of a local user, to modify the display screen outside the local window in response to the remote user operating the local computer outside the local window by remote input via the remote computer, to modify the display screen inside the local window in response to the remote user operating the local computer inside the local window by remote input via the remote computer, and to intercept local inputs made via the local input device by the local user so that the local inputs are confined to controlling a limited range of objects on the display screen of the local computer, including the local window, while the remote user is able to access areas of the display screen of the local computer and the local user is prevented from accessing areas of the display screen of the local computer beyond the local window.

20. The computer according to claim 19, wherein the local window is not reproduced in the image of the entire area of the display screen that is presented on the remote computer.

21. The computer according to claim 19, wherein the local input device comprises a local pointing device, and wherein the processor is configured to move a first cursor on the display screen in response to manipulation of a remote pointing device of the remote computer by the remote user, and to move a second cursor on the display screen, independently of the first cursor, under the control of the local user by means of the local pointing device.

22. The method of claim 1, wherein the desktop sharing program receives from the local user indications of windows that are not to be accessible to the remote user and prevents the remote user from accessing the indicated windows.

23. The method of claim 1, wherein the desktop sharing program receives from the local user indications of windows that are not to be displayed to the remote user and does not include the indicated windows in the image of the entire area of the display screen of the local computer provided to the remote user.

* * * * *